(12) United States Patent
Kashibuchi

(10) Patent No.: US 7,719,721 B2
(45) Date of Patent: May 18, 2010

(54) INFORMATION PROCESSING METHOD AND INFORMATION PROCESSING APPARATUS

(75) Inventor: Yoichi Kashibuchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 723 days.

(21) Appl. No.: 11/559,716

(22) Filed: Nov. 14, 2006

(65) Prior Publication Data

US 2007/0115508 A1 May 24, 2007

(30) Foreign Application Priority Data

Nov. 22, 2005 (JP) ............................. 2005-337495

(51) Int. Cl.
*H04N 1/405* (2006.01)
(52) U.S. Cl. ..................... 358/3.13; 358/3.16
(58) Field of Classification Search .................. 358/1.9, 358/2.1, 3.06, 3.13–3.14, 3.16–3.17, 3.21–3.22, 358/3.01
See application file for complete search history.

(56) References Cited

U.S. PATENT DOCUMENTS

| | | | | |
|---|---|---|---|---|
| 4,447,831 A | * | 5/1984 | Adsett | 358/3.2 |
| 4,814,886 A | * | 3/1989 | Kuge et al. | 358/3.17 |
| 5,067,025 A | * | 11/1991 | Kitagawa | 358/3.2 |
| 5,390,263 A | | 2/1995 | Guay | |
| 6,356,360 B1 | * | 3/2002 | Rushing et al. | 358/1.9 |
| 2005/0219628 A1 | * | 10/2005 | Yasutomi et al. | 358/3.16 |

FOREIGN PATENT DOCUMENTS

| | | |
|---|---|---|
| JP | 05-268465 A | 10/1993 |
| JP | 9-200519 | 7/1997 |
| JP | 2001-326814 A | 11/2001 |

* cited by examiner

*Primary Examiner*—Thomas D Lee
*Assistant Examiner*—Stephen M Brinich
(74) *Attorney, Agent, or Firm*—Canon U.S.A. Inc., I.P. Division

(57) ABSTRACT

Setting of growing directions of dots in a dither matrix is facilitated. During defining of the growing directions of the dots corresponding to cells in the dither matrix, a target cell in the dither matrix is defined. When the growing directions of the dots in cells located within a range of one cell from the target cell are not set, the target cell is set as a reference point. When the growing direction of the dot in the cell located at the immediate left or the immediate right of the target cell is set, the growing direction of the dot in the target cell is set based on setting states of the growing directions of the dots in the cells located at the immediate left and the immediate right of the target cell and the reference point.

13 Claims, 13 Drawing Sheets

FIG. 1

| SIGNAL VALUE | EXPOSURE PATTERN |
|---|---|
| 0000 | ONE PIXEL |
| 0001 | ONE PIXEL |
| 0010 | ONE PIXEL |
| 0011 | ONE PIXEL |
| 0100 | ONE PIXEL |
| 0101 | ONE PIXEL |
| 0110 | ONE PIXEL |
| 0111 | ONE PIXEL |
| 1000 | ONE PIXEL |
| 1001 | ONE PIXEL |
| 1010 | ONE PIXEL |
| 1011 | ONE PIXEL |
| 1100 | ONE PIXEL |
| 1101 | ONE PIXEL |
| 1110 | ONE PIXEL |
| 1111 | ONE PIXEL |

| 33 | 17 | 21 | 34 | 18 | 22 |
| --- | --- | --- | --- | --- | --- |
| 13 | 1 | 5 | 14 | 2 | 6 |
| 29 | 9 | 25 | 30 | 10 | 26 |
| 35 | 19 | 23 | 36 | 20 | 24 |
| 15 | 3 | 7 | 16 | 4 | 8 |
| 31 | 11 | 27 | 32 | 12 | 28 |

FIG. 6

| FIG. 6A |
|---------|
| FIG. 6B |

FIG. 6A

| LEVEL | THRESHOLD VALUE | LEVEL | THRESHOLD VALUE | LEVEL | THRESHOLD VALUE | LEVEL | THRESHOLD VALUE | LEVEL | THRESHOLD VALUE | LEVEL | THRESHOLD VALUE |
|---|---|---|---|---|---|---|---|---|---|---|---|
| 2 | 227 | 2 | 116 | 2 | 142 | 2 | 226 | 2 | 116 | 2 | 143 |
| 3 | 229 | 3 | 118 | 3 | 144 | 3 | 228 | 3 | 118 | 3 | 145 |
| 4 | 231 | 4 | 120 | 4 | 146 | 4 | 231 | 4 | 120 | 4 | 147 |
| 5 | 233 | 5 | 122 | 5 | 148 | 5 | 233 | 5 | 122 | 5 | 148 |
| 6 | 235 | 6 | 124 | 6 | 150 | 6 | 235 | 6 | 124 | 6 | 150 |
| 7 | 237 | 7 | 125 | 7 | 152 | 7 | 237 | 7 | 126 | 7 | 152 |
| 8 | 239 | 8 | 127 | 8 | 154 | 8 | 239 | 8 | 128 | 8 | 154 |
| 9 | 240 | 9 | 129 | 9 | 156 | 9 | 241 | 9 | 130 | 9 | 156 |
| 10 | 242 | 10 | 131 | 10 | 159 | 10 | 243 | 10 | 132 | 10 | 158 |
| 11 | 244 | 11 | 133 | 11 | 161 | 11 | 245 | 11 | 133 | 11 | 160 |
| 12 | 246 | 12 | 135 | 12 | 163 | 12 | 247 | 12 | 135 | 12 | 162 |
| 13 | 248 | 13 | 137 | 13 | 165 | 13 | 248 | 13 | 137 | 13 | 164 |
| 14 | 250 | 14 | 139 | 14 | 167 | 14 | 250 | 14 | 139 | 14 | 165 |
| 15 | 252 | 15 | 140 | 15 | 169 | 15 | 252 | 15 | 141 | 15 | 167 |
| LEVEL | 254 | LEVEL | THRESHOLD VALUE | LEVEL | THRESHOLD VALUE | LEVEL | 254 | LEVEL | THRESHOLD VALUE | LEVEL | 169 |
| 1 | 86 | 1 | 29 | 1 | 58 | 1 | 86 | 1 | 1 | 1 | 30 |
| 2 | 88 | 2 | 31 | 2 | 59 | 2 | 88 | 2 | 3 | 2 | 32 |
| 3 | 90 | 3 | 33 | 3 | 61 | 3 | 90 | 3 | 5 | 3 | 34 |
| 4 | 91 | 4 | 35 | 4 | 63 | 4 | 92 | 4 | 7 | 4 | 35 |
| 5 | 93 | 5 | 37 | 5 | 65 | 5 | 94 | 5 | 9 | 5 | 37 |
| 6 | 95 | 6 | 39 | 6 | 67 | 6 | 96 | 6 | 11 | 6 | 39 |
| 7 | 97 | 7 | 41 | 7 | 69 | 7 | 98 | 7 | 13 | 7 | 41 |
| 8 | 99 | 8 | 42 | 8 | 71 | 8 | 99 | 8 | 15 | 8 | 43 |
| 9 | 101 | 9 | 44 | 9 | 73 | 9 | 101 | 9 | 17 | 9 | 45 |
| 10 | 103 | 10 | 46 | 10 | 75 | 10 | 103 | 10 | 18 | 10 | 47 |
| 11 | 105 | 11 | 48 | 11 | 76 | 11 | 105 | 11 | 20 | 11 | 49 |
| 12 | 107 | 12 | 50 | 12 | 78 | 12 | 107 | 12 | 22 | 12 | 50 |
| 13 | 108 | 13 | 52 | 13 | 80 | 13 | 109 | 13 | 24 | 13 | 52 |
| 14 | 110 | 14 | 54 | 14 | 82 | 14 | 111 | 14 | 26 | 14 | 54 |
| 15 | 112 | 15 | 56 | 15 | 84 | 15 | 113 | 15 | 28 | 15 | 56 |
| LEVEL | THRESHOLD VALUE | LEVEL | THRESHOLD VALUE | LEVEL | THRESHOLD VALUE | LEVEL | THRESHOLD VALUE | LEVEL | THRESHOLD VALUE | LEVEL | THRESHOLD VALUE |
| 1 | 199 | 1 | 58 | 1 | 171 | 1 | 198 | 1 | 58 | 1 | 171 |
| 2 | 201 | 2 | 59 | 2 | 173 | 2 | 201 | 2 | 60 | 2 | 173 |
| 3 | 203 | 3 | 61 | 3 | 174 | 3 | 203 | 3 | 62 | 3 | 175 |
| 4 | 205 | 4 | 63 | 4 | 176 | 4 | 205 | 4 | 64 | 4 | 177 |
| 5 | 206 | 5 | 65 | 5 | 178 | 5 | 207 | 5 | 66 | 5 | 179 |
| 6 | 208 | 6 | 67 | 6 | 180 | 6 | 209 | 6 | 67 | 6 | 181 |
| 7 | 210 | 7 | 69 | 7 | 182 | 7 | 211 | 7 | 69 | 7 | 182 |
| 8 | 212 | 8 | 71 | 8 | 184 | 8 | 213 | 8 | 71 | 8 | 184 |
| 9 | 214 | 9 | 73 | 9 | 186 | 9 | 214 | 9 | 73 | 9 | 186 |
| 10 | 216 | 10 | 75 | 10 | 188 | 10 | 216 | 10 | 75 | 10 | 188 |
| 11 | 218 | 11 | 76 | 11 | 189 | 11 | 218 | 11 | 77 | 11 | 190 |
| 12 | 220 | 12 | 78 | 12 | 191 | 12 | 220 | 12 | 79 | 12 | 192 |
| 13 | 222 | 13 | 80 | 13 | 193 | 13 | 222 | 13 | 81 | 13 | 194 |
| 14 | 223 | 14 | 82 | 14 | 195 | 14 | 224 | 14 | 83 | 14 | 196 |
| 15 | 225 | 15 | 84 | 15 | 197 | 15 | 226 | 15 | 85 | 15 | 198 |

FROM FIG. 6A

| LEVEL | THRESHOLD VALUE | LEVEL | THRESHOLD VALUE | LEVEL | THRESHOLD VALUE | LEVEL | THRESHOLD VALUE | LEVEL | THRESHOLD VALUE | LEVEL | THRESHOLD VALUE |
|---|---|---|---|---|---|---|---|---|---|---|---|
| 1 | 228 | 1 | 115 | 1 | 143 | 1 | 229 | 1 | 116 | 1 | 144 |
| 2 | 230 | 2 | 117 | 2 | 145 | 2 | 230 | 2 | 117 | 2 | 146 |
| 3 | 232 | 3 | 119 | 3 | 147 | 3 | 232 | 3 | 119 | 3 | 148 |
| 4 | 234 | 4 | 121 | 4 | 149 | 4 | 234 | 4 | 121 | 4 | 149 |
| 5 | 236 | 5 | 123 | 5 | 151 | 5 | 236 | 5 | 123 | 5 | 151 |
| 6 | 238 | 6 | 124 | 6 | 153 | 6 | 238 | 6 | 125 | 6 | 153 |
| 7 | 239 | 7 | 126 | 7 | 155 | 7 | 240 | 7 | 127 | 7 | 155 |
| 8 | 241 | 8 | 128 | 8 | 157 | 8 | 242 | 8 | 129 | 8 | 157 |
| 9 | 243 | 9 | 130 | 9 | 158 | 9 | 244 | 9 | 131 | 9 | 159 |
| 10 | 245 | 10 | 132 | 10 | 160 | 10 | 245 | 10 | 132 | 10 | 161 |
| 11 | 247 | 11 | 134 | 11 | 162 | 11 | 247 | 11 | 134 | 11 | 163 |
| 12 | 249 | 12 | 136 | 12 | 164 | 12 | 249 | 12 | 136 | 12 | 165 |
| 13 | 251 | 13 | 138 | 13 | 166 | 13 | 251 | 13 | 138 | 13 | 166 |
| 14 | 253 | 14 | 140 | 14 | 168 | 14 | 253 | 14 | 140 | 14 | 168 |
| 15 | 255 | 15 | 141 | 15 | 170 | 15 | 256 | 15 | 142 | 15 | 170 |
| LEVEL | THRESHOLD VALUE | LEVEL | THRESHOLD VALUE | LEVEL | THRESHOLD VALUE | LEVEL | THRESHOLD VALUE | LEVEL | THRESHOLD VALUE | LEVEL | THRESHOLD VALUE |
| 1 | 87 | 1 | 2 | 1 | 30 | 1 | 87 | 1 | 2 | 1 | 31 |
| 2 | 89 | 2 | 4 | 2 | 32 | 2 | 89 | 2 | 4 | 2 | 33 |
| 3 | 91 | 3 | 6 | 3 | 34 | 3 | 91 | 3 | 6 | 3 | 34 |
| 4 | 92 | 4 | 8 | 4 | 36 | 4 | 93 | 4 | 8 | 4 | 36 |
| 5 | 94 | 5 | 9 | 5 | 38 | 5 | 95 | 5 | 10 | 5 | 38 |
| 6 | 96 | 6 | 11 | 6 | 40 | 6 | 97 | 6 | 12 | 6 | 40 |
| 7 | 98 | 7 | 13 | 7 | 42 | 7 | 99 | 7 | 14 | 7 | 42 |
| 8 | 100 | 8 | 15 | 8 | 43 | 8 | 100 | 8 | 16 | 8 | 44 |
| 9 | 102 | 9 | 17 | 9 | 45 | 9 | 102 | 9 | 17 | 9 | 46 |
| 10 | 104 | 10 | 19 | 10 | 47 | 10 | 104 | 10 | 19 | 10 | 48 |
| 11 | 106 | 11 | 21 | 11 | 49 | 11 | 106 | 11 | 21 | 11 | 50 |
| 12 | 108 | 12 | 23 | 12 | 51 | 12 | 108 | 12 | 23 | 12 | 51 |
| 13 | 109 | 13 | 25 | 13 | 53 | 13 | 110 | 13 | 25 | 13 | 53 |
| 14 | 111 | 14 | 26 | 14 | 55 | 14 | 112 | 14 | 27 | 14 | 55 |
| 15 | 113 | 15 | 28 | 15 | 57 | 15 | 114 | 15 | 29 | 15 | 57 |
| LEVEL | THRESHOLD VALUE | LEVEL | THRESHOLD VALUE | LEVEL | THRESHOLD VALUE | LEVEL | THRESHOLD VALUE | LEVEL | THRESHOLD VALUE | LEVEL | THRESHOLD VALUE |
| 1 | 200 | 1 | 58 | 1 | 172 | 1 | 200 | 1 | 59 | 1 | 172 |
| 2 | 202 | 2 | 60 | 2 | 173 | 2 | 202 | 2 | 61 | 2 | 174 |
| 3 | 204 | 3 | 62 | 3 | 175 | 3 | 204 | 3 | 63 | 3 | 176 |
| 4 | 206 | 4 | 64 | 4 | 177 | 4 | 206 | 4 | 65 | 4 | 178 |
| 5 | 207 | 5 | 65 | 5 | 179 | 5 | 208 | 5 | 67 | 5 | 180 |
| 6 | 209 | 6 | 67 | 6 | 181 | 6 | 210 | 6 | 68 | 6 | 181 |
| 7 | 211 | 7 | 69 | 7 | 183 | 7 | 212 | 7 | 70 | 7 | 183 |
| 8 | 213 | 8 | 71 | 8 | 185 | 8 | 214 | 8 | 72 | 8 | 185 |
| 9 | 215 | 9 | 73 | 9 | 187 | 9 | 215 | 9 | 74 | 9 | 187 |
| 10 | 217 | 10 | 75 | 10 | 189 | 10 | 217 | 10 | 76 | 10 | 189 |
| 11 | 219 | 11 | 77 | 11 | 190 | 11 | 219 | 11 | 78 | 11 | 191 |
| 12 | 221 | 12 | 79 | 12 | 192 | 12 | 221 | 12 | 80 | 12 | 193 |
| 13 | 222 | 13 | 81 | 13 | 194 | 13 | 223 | 13 | 82 | 13 | 195 |
| 14 | 224 | 14 | 83 | 14 | 196 | 14 | 225 | 14 | 83 | 14 | 197 |
| 15 | 226 | 15 | 85 | 15 | 198 | 15 | 227 | 15 | 85 | 15 | 198 |

FIG. 7

| R | L | L | R | L | L |
|---|---|---|---|---|---|
| R | C | L | R | C | L |
| R | L | L | R | L | L |
| R | L | L | R | L | L |
| R | C | L | R | C | L |
| R | L | L | R | L | L |

FIG. 8

HALFTONE LEVEL 29
HALFTONE LEVEL 44
HALFTONE LEVEL 157

FIG. 11
HALFTONE LEVEL 29 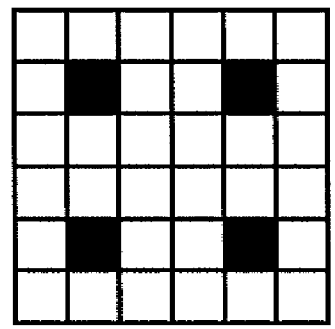
HALFTONE LEVEL 44 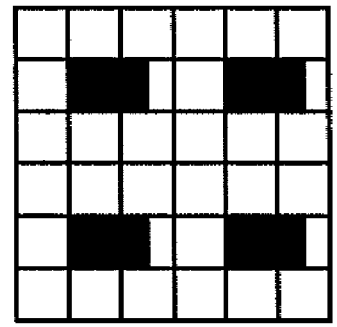
HALFTONE LEVEL 157 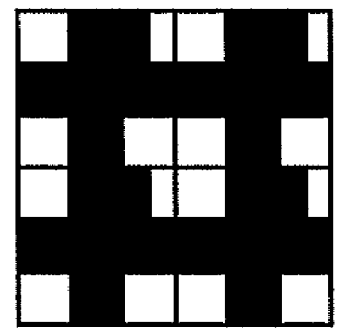

| 227 | 114 | 142 | 228 | 115 | 143 |
| --- | --- | --- | --- | --- | --- |
| 86 | 1 | 29 | 86 | 1 | 30 |
| 199 | 58 | 171 | 199 | 58 | 171 |
| 228 | 115 | 143 | 229 | 116 | 144 |
| 87 | 2 | 30 | 87 | 2 | 31 |
| 200 | 58 | 172 | 200 | 59 | 172 |

INFORMATION PROCESSING METHOD AND INFORMATION PROCESSING APPARATUS

BACKGROUND OF THE INVENTION

1. Field of the Invention

The present invention relates to information processing methods and apparatuses employing the information processing methods.

2. Description of the Related Art

There has been a marked increase in the use of image-processing apparatuses such as printers and copying machines in recent years. With this, the performance of the image-processing apparatuses, for example, quality of output images, has been significantly improved. Moreover, various recording methods such as silver-salt film recording, thermal recording, electrophotographic recording, electrostatic recording, and ink-jet recording have been developed.

In general, multilevel image data is binarized before image formation in order to save memory used for image processing and to stabilize dot shapes. A binary dither method is one such binarizing method.

There has been a need for expressing smooth halftones and gradation of photographs with colorization of the image-processing apparatuses. However, smooth and high-quality output images cannot be obtained by the above-described binary dither method. A multilevel dither method has drawn attention as a method for solving this problem. In the multilevel dither method, a number of threshold values are provided for each cell in a dither matrix. As a result, the value of each pixel after dither processing can be one of multiple levels. When the multilevel dither method is employed, so-called multiple tone recording in which three or more tones can be recorded is required as a matter of course. For example, laser-beam printers of an electrophotographic type realize the multiple tone recording by using pulse width modulation (PWM).

FIG. 1 illustrates an example of an exposure pattern of a printer capable of recording with a 16-step gradation, the exposure pattern illustrating the correspondence between input-signal values and pulse widths. In the drawing, sections between two broken lines correspond to a pixel, and laser beams having the pulse widths are emitted to the pixels. An exposure controller in the printer outputs pulse-modulated laser beams according to the exposure pattern shown in FIG. 1, and the laser beams are incident on the surface of a photosensitive drum. Toner is then applied to the surface of the photosensitive drum such that dots are formed on the photosensitive drum.

In PWM control as shown in FIG. 1, the dot area in each pixel grows from the center of the pixel. When low-density dots are continuously disposed next to each other, gaps are created between the dots. This leads to poor dot reproducibility and, moreover, low image quality characteristics such as roughness on images and toner scattering. In order to stabilize the image quality, the dot area growth may be controlled by changing the exposure pattern or laser-driving timing such that halftone pixels are not isolated. Japanese Patent Laid-Open No. 9-200519 discloses one such method. That is, the growing directions of the dots in the dither matrix used for multilevel dither processing are defined in advance, and dot-forming processes are switched according to the growing direction in each pixel.

However, the above-described method has difficulty in defining optimum growing directions when the size of the dither matrix is large. Moreover, the optimum growing directions cannot be defined when each cell in the dither matrix includes a submatrix. Furthermore, the growing directions in the dither matrix cannot be defined in advance when the image-processing apparatus automatically generates the dither matrix.

SUMMARY OF THE INVENTION

The present invention is directed to a method for easily setting growing directions of dots in a dither matrix used for multilevel dither processing.

The present invention is also directed to a method for setting growing directions of dots according to an automatically generated dither matrix.

An information processing method according to one aspect of the present invention includes defining a target cell in the dither matrix; setting the target cell as a reference point when the growing directions of the dots in cells located within a range of one cell from the target cell are not set; and setting the growing direction of the dot in the target cell based on setting states of the growing directions of the dots in the cells located at the immediate left and the immediate right of the target cell and the reference point during defining of growing directions of dots corresponding to cells in a dither matrix used for multilevel dither processing.

An information processing apparatus according to another aspect of the present invention controls growing directions of dots corresponding to cells in a dither matrix used for multilevel dither processing, and includes a generating unit that generates a position-controlling matrix based on the dither matrix, the position-controlling matrix indicating the growing directions of the dots; a dither-processing unit that performs the multilevel dither processing on image data using the dither matrix; and an adding unit that adds control data to the image data after the multilevel dither processing using the position-controlling matrix, the control data indicating the growing directions of the dots.

Further features of the present invention will become apparent from the following description of exemplary embodiments with reference to the attached drawings.

BRIEF DESCRIPTION OF THE DRAWINGS

FIG. 1 illustrates an example of an exposure pattern of a printer capable of recording with a 16-step gradation, the exposure pattern illustrating the correspondence between input-signal values and pulse widths.

FIGS. 6A and 6B illustrate the dither matrix used for multilevel (4-bit) dither processing performed sequentially in increasing order of growth shown in FIG. 5.

FIG. 7 illustrates an example of a position-controlling matrix used for adding position-controlling data in lateral control.

FIG. 8 illustrates an example of pulse signals to be generated by a printer in PWM control.

FIG. 11 illustrates results of image formation obtained by controlling the growing directions of the dots.

DESCRIPTION OF THE EMBODIMENTS

First Exemplary Embodiment

Image processing according to a first exemplary embodiment of the present invention will now be described in detail with reference to the drawings.

Figure 2:
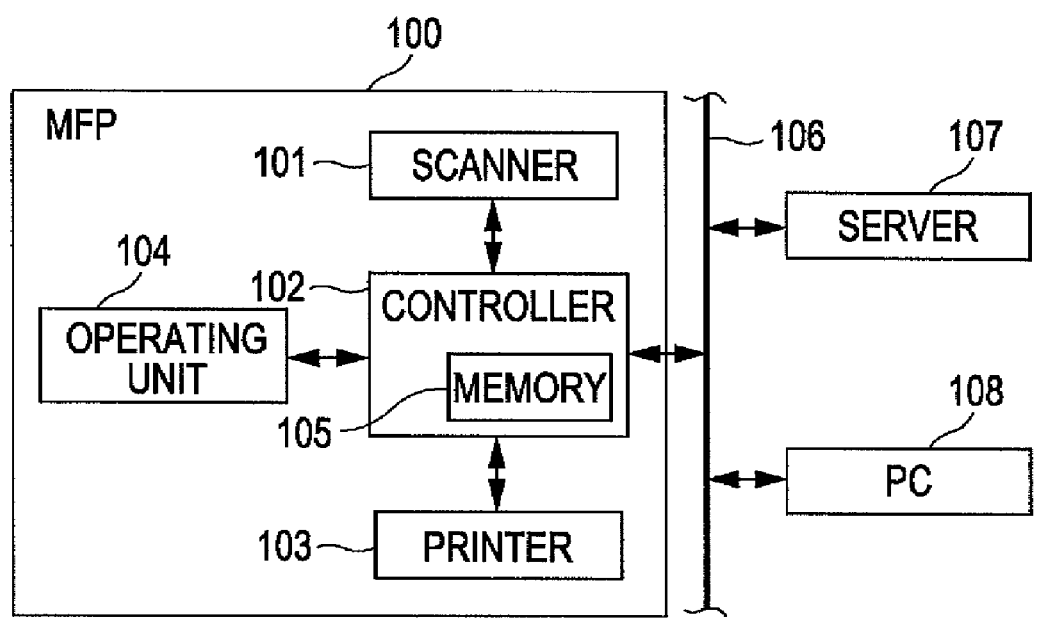
FIG. 2 is a block diagram illustrating an exemplary structure of an image-forming system.

FIG. 2 is a block diagram illustrating an exemplary structure of an image-forming system.

A digital multifunctional apparatus (MFP) 100 includes a controller 102 that controls the MFP 100. The controller 102 drives a scanner 101 to read original images, processes image data output from the scanner 101, and stores the data in a memory 105. The controller 102 reads the image data out of the memory 105, and inputs the data to a printer 103 so as to form images on recording paper (copying function).

Moreover, the controller 102 performs printing by controlling the printer 103 on the basis of print jobs input via a network 106 in accordance with requests from a server 107 and/or a client PC 108 via the network 106 (printing function). Furthermore, the controller 102 transmits the image data output from the scanner 101 to the server 107 and/or the client PC 108 via the network 106 (network scanning function).

Furthermore, the controller 102 performs facsimile (fax) communication using public networks (not shown) so as to print received facsimile images using the printer 103 and to send images read by the scanner 101 by fax (facsimile function). In addition, the controller 102 can send images designated by the client PC 108 to destinations designated by the client PC 108 by fax, and can transfer received facsimile images to the server 107 and/or the client PC 108 (network facsimile function).

An operating unit 104 displays the operating state of the MFP 100, and at the same time, functions as a user interface in the MFP 100 for inputting various information such as reading conditions of the scanner 101, printing conditions of the memory 105, and destinations of facsimile, commands for starting copying or sending facsimiles, and the like. Moreover, the operating unit 104 is also used for system setting of the MFP 100. An interface function similar to that of the operating unit 104 can be provided to the client PC 108.

[MFP]

Figure 3A:
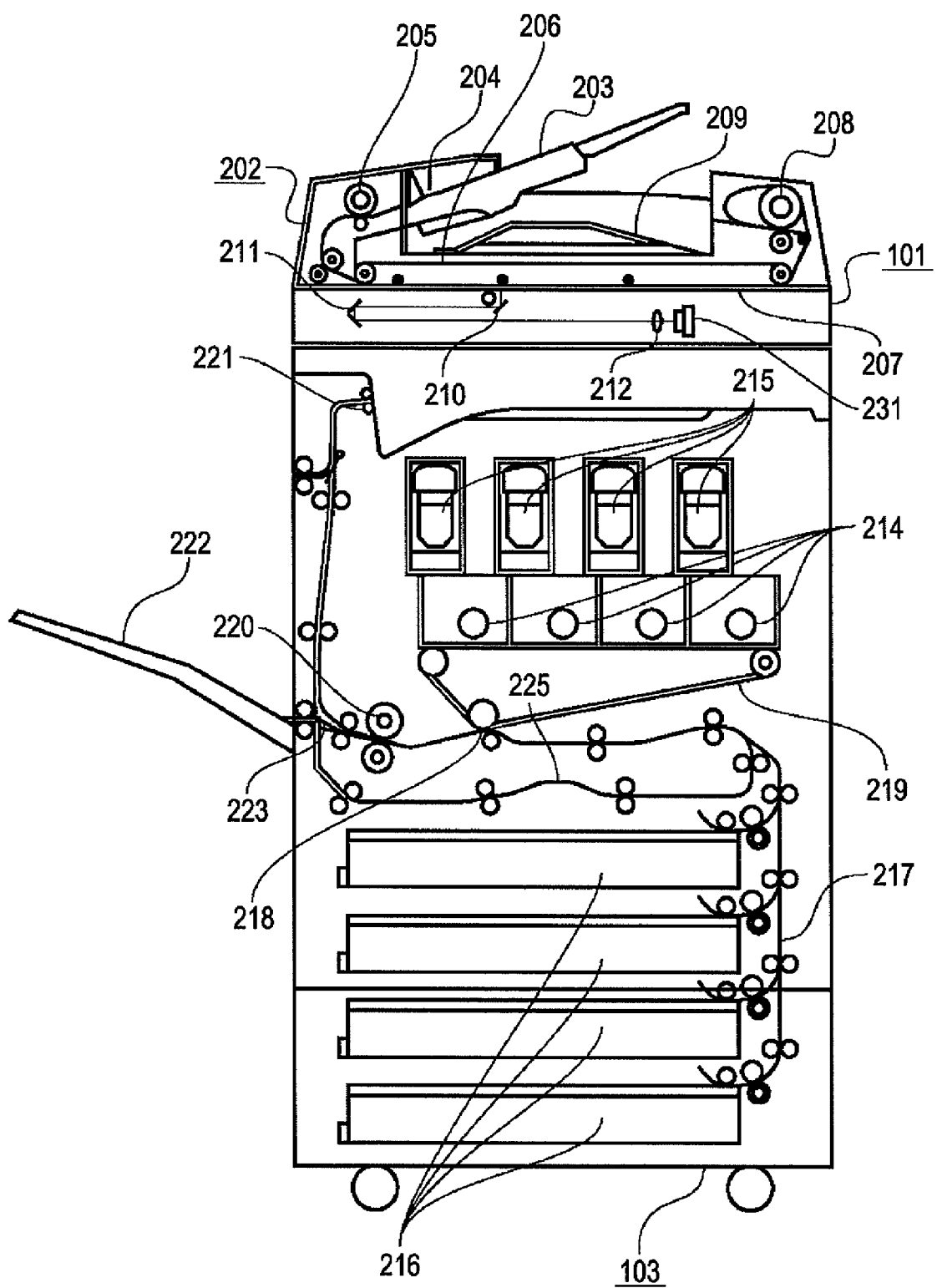
FIG. 3A illustrates a digital multifunctional apparatus (MFP)

FIG. 3A illustrates an exemplary MFP 100 including a document feeder (DF) 202, the scanner 101, and the printer 103 having drums for four colors.

Figure 3B:
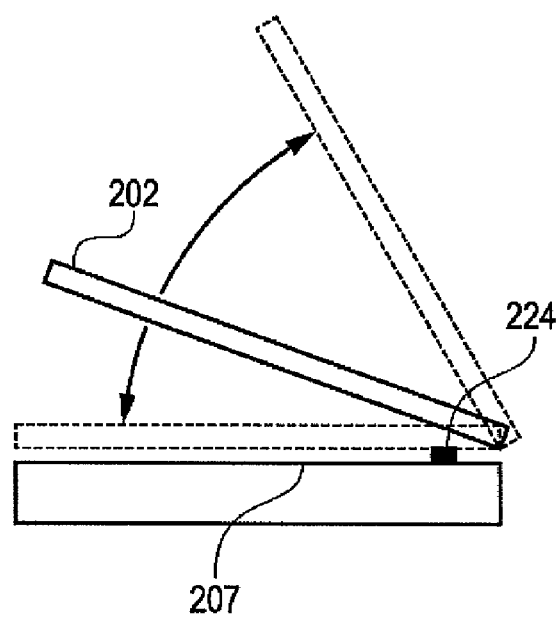
FIG. 3B illustrates a switching sensor.
Figure 3C:
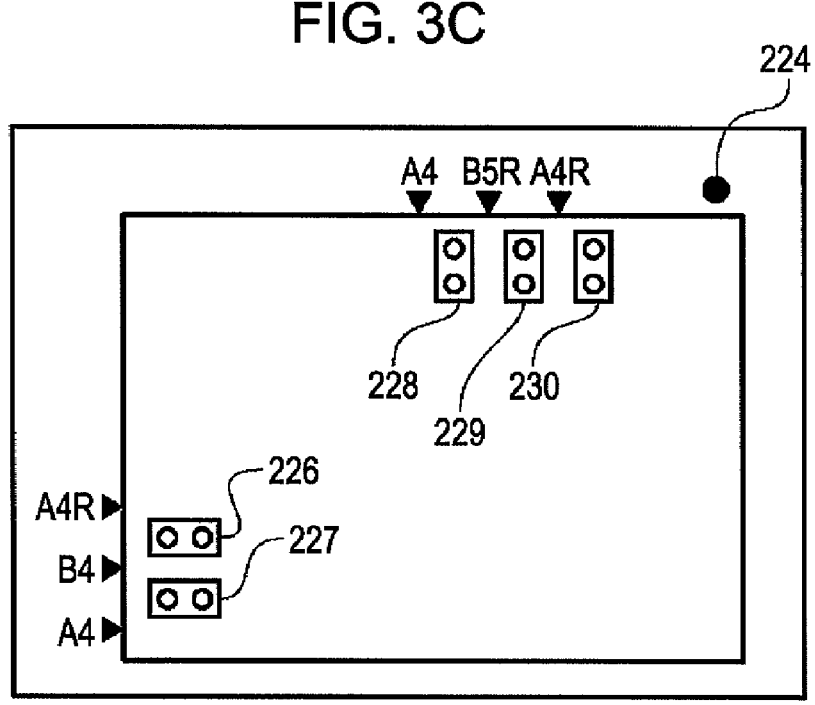
FIG. 3C illustrates reflective size-detecting sensors for detecting the size of an original document disposed in a housing under a platen glass.

First, a reading operation of the scanner 101 will be described. When original images are read without using the DF 202, a user directly places an original document on a platen glass 207, and then closes the DF 202. The controller 102 detects that the DF 202 is closed using a switching sensor 224 shown in FIG. 3B. The controller 102 then detects the size of the original document using reflective size-detecting sensors 226 to 230 shown in FIG. 3C disposed in a housing under the platen glass 207, and illuminates the original document with light from a light source 210. The light reflected from the original document is made incident on a charge-coupled device (CCD) 231 via a mirror 211 and an fθ lens 212. The controller 102 converts image signals output from the CCD 231 into digital signals, and stores the image data after image processing for scanning in the memory 105.

When original images are read using the DF 202, the user places original documents on an input tray 203 of the DF 202. When the controller 102 detects the presence of the original documents using an original-detecting sensor 204, the controller 102 drives a feeding roller 205 and a carrying belt 206 so as to send the original documents to a predetermined position on the platen glass 207 one by one. After this, the original images are read and the image data is stored in the memory 105 as in the case when the original documents are directly placed on the platen glass 207.

After reading one original image, the controller 102 drives the carrying belt 206 and an ejecting roller 208 so as to eject the original document to an output tray 209. In the case of multiple original documents, the controller 102 drives the feeding roller 205 and the carrying belt 206 so as to send the next original document to the predetermined position on the platen glass 207 at the same time as the ejection of the previous original document.

Next, a printing operation of the printer 103 will be described. The controller 102 performs image processing for printing on the image data stored in the memory 105, and sends data of four color components of cyan (C), magenta (M), yellow (Y), and black (K) to the printer 103. The printer 103 generates PWM signals according to the color component data, and supplies the signals to four laser-recording sections (not shown). The laser-recording sections control the emission of laser beams according to the PWM signals. The laser beams output from the laser-recording sections scan across corresponding photosensitive members 214 such that electrostatic latent images are formed on the surfaces of the photosensitive members 214.

The electrostatic latent images are developed with toner supplied by corresponding toner cartridges 215, and resultant toner images are primarily transferred to an intermediate transfer belt 219. The intermediate transfer belt 219 rotating in the clockwise direction in FIG. 3A is brought into contact with a recording paper that is fed from one of paper cassettes 216 via a feeding route 217 at a secondary transfer position 218, and the toner images carried by the intermediate transfer belt 219 are transferred to the recording paper.

The recording paper having the toner images is pressurized and heated by a fixing unit 220 such that the toner is fixed to the paper, and is ejected to a central tray 221 face down or a side tray 222 face up through an ejecting route. A flapper 223 switches between carrying routes of the paper so as to change between the output trays. In the case of double-sided printing, the recording paper passing through the fixing unit 220 is fed in the direction to the central tray 221, guided back to a double-sided printing route 225, and then fed to the feeding route 217 again.

[Image Processing for Printing]

Figures 4, 5:
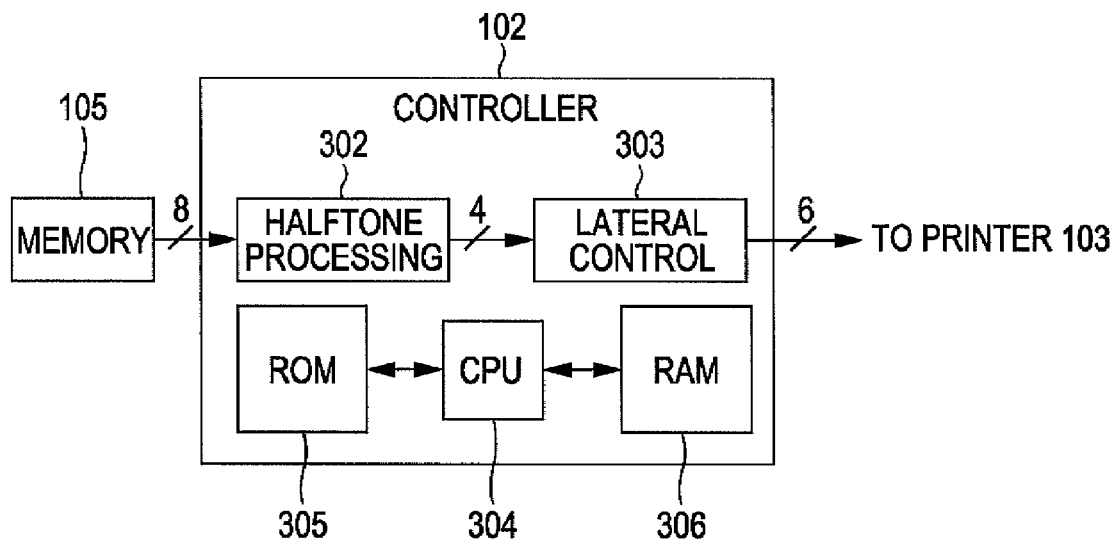
FIG. 4 is a functional block diagram illustrating image processing for printing.
FIG. 5 shows a growing order of dots in cells in a matrix, a dither matrix being based on the matrix.

FIG. 4 is a functional block diagram illustrating the image processing for printing.

A central processing unit (CPU) 304 of the controller 102 executes programs stored in a read-only memory (ROM) 305 using a random-access memory (RAM) 306 serving as a working memory so as to conduct various image processing such as halftone processing 302 and lateral control 303. The memory 105 may be allocated to the RAM 306, or may be allocated to another memory such as a hard disk.

In the halftone processing 302, the image data of, for example, an 8-bit depth (256 levels of gray) read out of the memory 105 is subjected to multilevel dither processing so as to be converted into image data of a 4-bit depth (16 levels of gray). In the lateral control 303, 2-bit position-controlling data, which indicates growing directions of dots, is added onto the most significant bit (MSB) of the image data after the halftone processing 302 using a position-controlling matrix corresponding to the dither matrix used for the multilevel dither processing in the halftone processing 302. The controller 102 sends the 6-bit image data including the position-controlling data to the printer 103.

[Dither Matrix]

Next, the dither matrix used for the multilevel (4-bit) dither processing in the halftone processing 302 will be described.

FIG. 5 shows a growing order of dots in cells in a matrix, the dither matrix being based on the matrix. In the drawing, numbers from 1 to 36 assigned in thirty-six cells indicate the growing order of dots in the cells. FIGS. 6A and 6B illustrate the dither matrix used for the multilevel (4-bit) dither processing performed sequentially in increasing order of growth shown in FIG. 5. The dither matrix shown in FIGS. 6A and 6B also includes thirty-six cells as in the matrix shown in FIG. 5. Each of the cells has fifteen threshold values corresponding to halftone levels of 1 to 15. The dither matrix shown in FIGS. 6A and 6B is retained in the ROM 305.

In the halftone processing 302, a reference cell is selected from the dither matrix shown in FIGS. 6A and 6B according to the coordinates of a pixel of input image data, and 4-bit output image data of the pixel is determined on the basis of the threshold values of the selected cell. That is, the input image data (input pixel value) is compared with the threshold values in the selected cell, and a halftone level is determined as the output image data, the input pixel value being equal to or greater than the threshold value of the halftone level and less than the threshold value of the next higher halftone level.

[Position-Controlling Matrix]

FIG. 7 illustrates an example of the position-controlling matrix used for adding the position-controlling data in the lateral control 303.

The number of cells in the position-controlling matrix is the same as that in the dither matrix, and the cells in the position-controlling matrix correspond to those in the dither matrix. In the lateral control 303, a reference cell is selected from the position-controlling matrix according to the coordinates of the pixel of the image data after the dither processing, 2-bit position-controlling data stored in the selected cell is added onto the MSB of the image data after the dither processing, and then 6-bit image data is output. The position-controlling matrix shown in FIG. 7 is retained in the ROM 305.

Notations "R", "C", and "L" in the cells shown in FIG. 7 indicate the growing directions of the dots. "R" means the growth from the right end to the left end of the pixel, "C" means the growth from the center to both ends of the pixel, and "L" means the growth from the left end to the right end of the pixel. The 2-bit position-controlling data may be 01 for "R", 00 for "C", and 10 for "L", for example. The position-controlling matrix is determined on the process described below.

Figure 8:
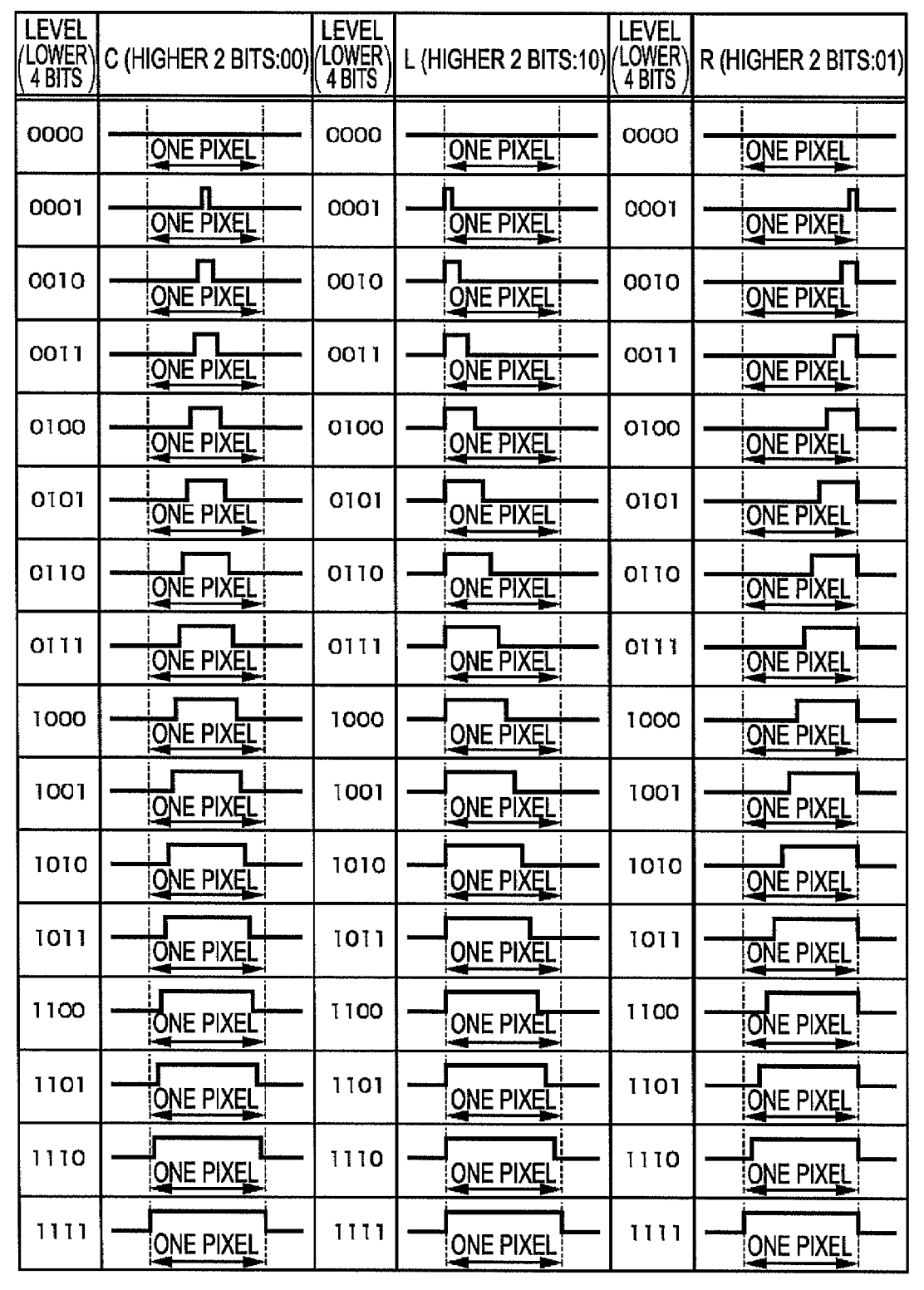

FIG. 8 illustrates an example of pulse signals to be generated by the printer 103 in the PWM control. The printer 103 separates the 6-bit image data into lower 4-bit image signals and higher 2-bit growth-controlling signals in each pixel for the PWM control so as to generate pulse signals. With this, the printer 103 can change the growing directions of the dots in each pixel.

[Determination of Position-Controlling Matrix]

As described above, the cells in the position-controlling matrix correspond to those in the dither matrix in a one-to-one relationship. The position-controlling data in the position-controlling matrix is determined on the basis of the threshold values in the dither matrix and the below-described process.

The determination of the position-controlling data starts from a cell having the smallest ordinal number of growth (whose ordinal number of growth is 1) in the matrix shown in FIG. 5, and is repeated sequentially in increasing order of growth so as to determine the position-controlling data for all the cells. Moreover, the position-controlling matrix is repeatedly applied to the image data as in the case of the dither matrix. In order to determine the position-controlling data of a target cell at the left end of the matrix, the cell at the right end in the same row is used for the reference instead of the left adjacent cell of the target cell. Similarly, when a target cell is at the right end of the matrix, the cell at the left end in the same row is used for the reference instead of the right adjacent cell of the target cell.

Figure 9:
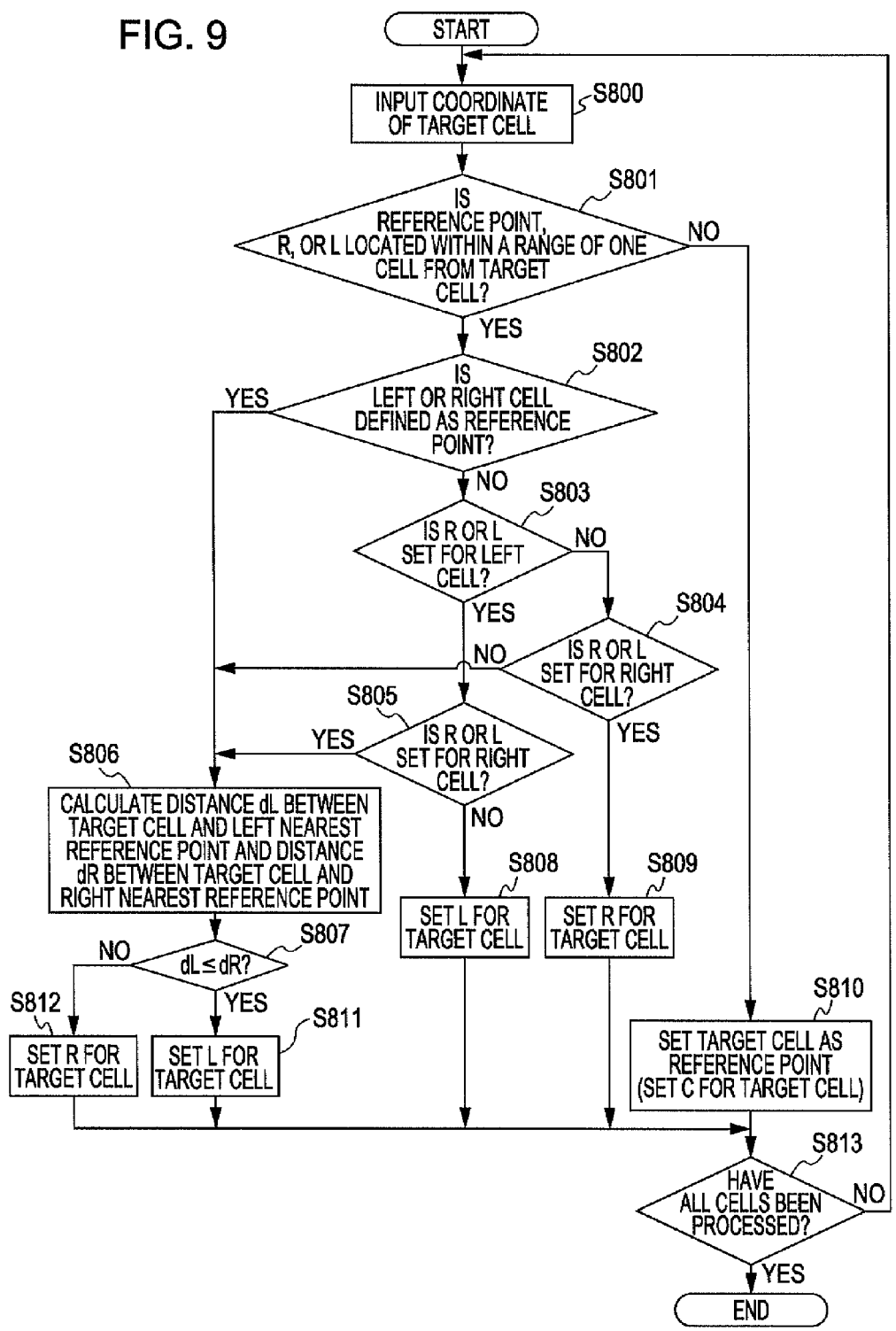
FIG. 9 is a flow chart illustrating processing for determining the position-controlling matrix.

FIG. 9 is a flow chart illustrating an exemplary process for determining the position-controlling matrix.

First, coordinates (x, y) of a cell whose ordinal number of growth is 1 are input (Step S800). In other words, the cell whose ordinal number of growth is 1 is defined as a target cell. Then, it is determined whether a reference point (a cell having the growing direction of R, or a cell having the growing direction of L) is located within a range of one cell from the target cell (Step S801). When the cell whose ordinal number of growth is 1 is the target cell, no reference point is defined yet. Thus, when it is determined that there is not a reference point located within one cell from the target cell, the target cell is defined as a reference point, and predetermined position-controlling data (for example, C) is set for the cell (Step S810). Then, it is determined in step S813 whether all the cells have been processed. If it is determined in step S813 that all of the cells have been processed, processing ends. On the other hand, if it is determined in step S813 that not all of the cells have been processed, the process returns to Step S800 to process the next cell.

In the case of the growing order shown in FIG. 5, cells whose ordinal numbers of growth are 2, 3, and 4 are defined as reference points as in the case of the cell whose ordinal number of growth is 1, and predetermined position-controlling data is set for the cells. Then, it is determined whether all the cells have been processed in Step S813, and the process returns to Step S800.

Next, when a cell whose ordinal number of growth is 5 is defined as a target cell (Step S800), the cell whose ordinal number of growth is 1 located within a range of one cell from the target cell is defined as the reference point through the above-described processes (Yes in Step S801). Therefore, it is determined whether the left cell or the right cell of the target cell is defined as the reference point (Step S802). In this case, the left cell (whose ordinal number of growth is 1) is defined as the reference point, and the process proceeds to Step S806. Next, a distance dL between the target cell and the nearest reference point at the left side of the target cell and a distance dR between the target cell and the nearest reference point at the right side of the target cell are determined (Step S806). In the case of the cell whose ordinal number of growth is 5 shown in FIG. 5, the distance dL from the left nearest reference point (whose ordinal number of growth is 1) is 1, and the distance dR from the right nearest reference point (whose ordinal number of growth is 2) is 2. When the two distances are compared (Step S807), the distance dL is smaller than or equal to the distance dR. Therefore, the growing direction of L is set for the target cell (Step S811). When the distance dL is larger than the distance dR in Step S807, the growing direction of R is set for the target cell (Step S812). After setting the growing direction for the target cell to L (step S811) or R (step S812), processing proceeds to step S813 to determine whether all the cells have been processed. If it is determined in step S813 that all of the cells have been processed, processing ends. On the other hand, if it is determined in step S813 that not all of the cells have been processed, the process returns to Step S800 to process the next cell.

In this manner, the distance dL and the distance dR are calculated for cells whose ordinal numbers of growth are 6 or more, and position-controlling data is set for the target cells according to the comparison results. For example, cells whose ordinal numbers of growth are 21 to 28 are defined as target cells (S800). These cells are located at the right sides of cells having the growing directions of L or R, and located at the left sides of cells without position-controlling data. Therefore, according to the determination in Step S805, the growing direction of L is set for the target cells (Step S808). When it is determined in Step S802 that the left cell and the right cell of the target cell are not defined as reference points, the process proceeds to Step S803. When it is determined in Step S803 that the growing direction of R or L is not set for the left cell of the target cell, the process proceeds to Step S804. When it is determined in Step S804 that the growing direction of R or L is set for the right cell of the target cell, the growing direction of R is set for the target cell (Step S809). When it is determined in Step S804 that the growing direction of R or L is not set for the right cell of the target cell, the process proceeds to Step S806 so as to perform the above-described processes.

Through the above-described processes, a position-controlling matrix as the one shown in FIG. 7 corresponding to the growing order shown in FIG. 5 and the most suitable for the dither matrix shown in FIGS. 6A and 6B can be generated.

[Output Result]

Figure 10:
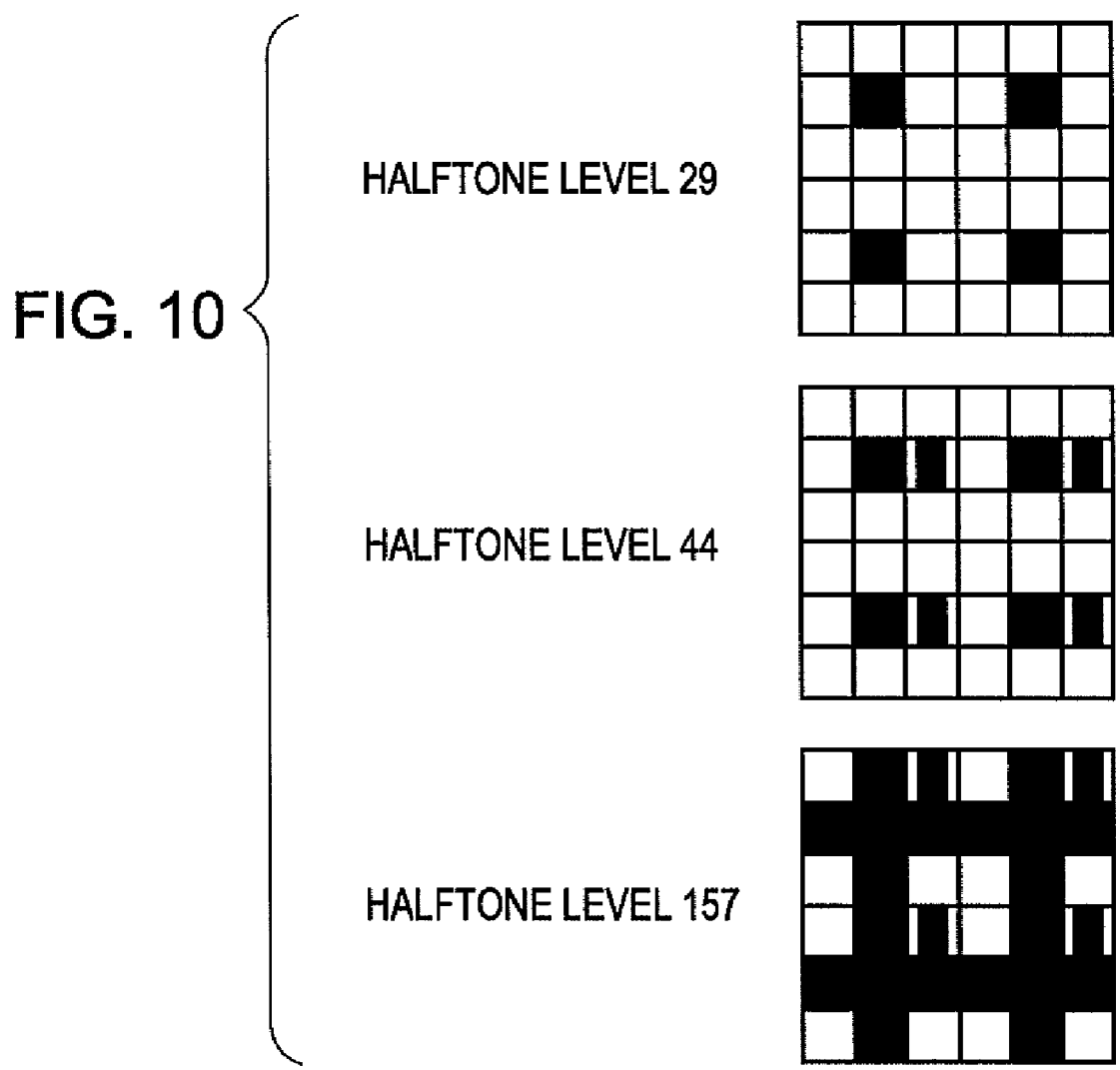
FIG. 10 illustrates results of image formation without controlling growing directions of dots.

FIG. 10 illustrates results of image formation without controlling the growing directions of the dots, and FIG. 11 illustrates results of image formation obtained by controlling the growing directions of the dots, the images having uniform densities at halftone levels of 29, 44, and 157. The results at the halftone levels of 44 and 157 shown in FIG. 10 have isolated dots, whereas the results at the halftone levels of 44 and 157 do not have such isolated dots.

As described above, the position-controlling matrix having the position-controlling data that indicates the appropriate growing directions of the dots is prepared for the dither matrix for the multilevel dither processing, and the position-controlling data is added to the image data after the multilevel dither processing such that the growing directions of the dots during image formation are controlled. With this, isolation of the dots in halftone pixels, which leads to roughness on images or toner scattering, can be prevented, and the reproducibility of the dots is improved.

Second Exemplary Embodiment

Image processing according to a second exemplary embodiment of the present invention will now be described. In the second exemplary embodiment, the same reference numerals as in the first exemplary embodiment are used for components substantially the same as those in the first exemplary embodiment, and the detailed descriptions thereof will not be repeated.

[Generation of Position-Controlling Matrix]

Figures 12, 13:
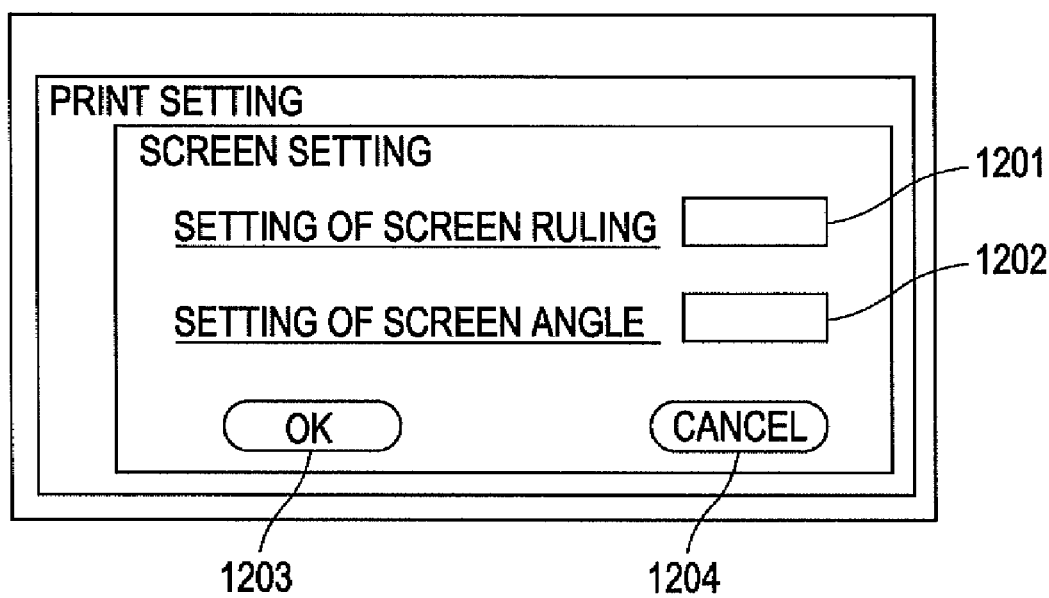
FIG. 12 illustrates a matrix including threshold values at an output level of 1 retrieved from the dither matrix shown in FIGS. 6A and 6B.
FIG. 13 illustrates an example of a screen displayed on an operating unit or the like during setting of printing conditions.

In the first exemplary embodiment, the position-controlling data is determined sequentially in increasing order of growth shown in FIG. 5. This is synonymous with determination of the position-controlling data using threshold values at an output level of 1 in each cell in the dither matrix shown in FIGS. 6A and 6B. In that case, the above-described processes can be performed sequentially in increasing order of threshold values. FIG. 12 illustrates a matrix including threshold values at the output level of 1 retrieved from the dither matrix shown in FIGS. 6A and 6B.

Automatic generation of the position-controlling matrix using the threshold values at the output level of 1 in each cell according to the second exemplary embodiment will now be described with reference to the flow chart shown in FIG. 9.

The determination of the position-controlling data in the position-controlling matrix starts from a cell having the smallest threshold value in the matrix shown in FIG. 12, and is repeated sequentially in increasing order of threshold values. Therefore, a cell having a threshold value of 1 is first defined as a target cell whose coordinates are input (Step S800). Then, it is determined whether a reference point (a cell having the growing direction of R, or a cell having the growing direction of L) is located within a range of one cell from the target cell (Step S801). When the cell whose threshold value is 1 is the target cell, no reference point is defined yet. Thus, the target cell is defined as a reference point, and predetermined position-controlling data (for example, C) is set for the cell (Step S810). Then, it is determined whether all the cells have been processed in Step S813. If it is determined in step S813 that all of the cells have been processed, processing ends. On the other hand, if it is determined in step S813 that not all of the cells have been processed, processing returns to step S800 to process the next cell. Here, there are two cells having the threshold value of 1 in FIG. 12. These cells are separately processed at the same time. Through the above-described processes, the position-controlling data for the two cells having the threshold value of 1 shown in FIG. 12 is determined.

Next, two cells having a threshold value of 2 are processed in the same manner, and the position-controlling data for the cells is determined such that two more cells are defined as reference points.

Next, when a cell whose threshold value is 29 is defined as a target cell (Step S800), the cell whose threshold value is 1 located within a range of one cell from the target cell is defined as the reference point through the above-described processes (Yes in Step S801). Therefore, it is determined whether the left cell or the right cell of the target cell is defined as the reference point (Step S802). In this case, the left cell (whose threshold value is 1) is defined as the reference point, and the process proceeds to Step S806.

Next, the distance dL between the target cell and the nearest reference point at the left side of the target cell and the distance dR between the target cell and the nearest reference point at the right side of the target cell are determined (Step S806). In the case of the cell whose threshold value is 29 shown in FIG. 12, the distance dL from the left nearest reference point (whose threshold value is 1) is 1, and the distance dR from the right nearest reference point (whose threshold value is 1) is 2. When the two distances are compared (Step S807), the distance dL is smaller than or equal to the distance dR. Therefore, the growing direction of L is set for the target cell (Step S811). When the distance dL is larger than the distance dR in Step S807, the growing direction of R is set for the target cell (Step S812). After setting the growing direction for the target cell to L (step S811) or to R (step S812), processing proceeds to step S813 and it is determined whether all the cells have been processed. If it is determined in step S813 that all of the cells have been processed, processing ends. On the other hand, if it is determined in step S813 that not all of the cells have been processed, processing returns to step S800 to process the next cell.

In this manner, the distance dL and the distance dR are calculated for cells whose threshold values are 29 or more, and position-controlling data is set for the target cells according to the comparison results. For example, cells whose threshold values are 142, 143, 144, 171, and 172 are located at the right sides of cells having the growing directions of L or R, and located at the left sides of cells without position-controlling data. Therefore, according to the determination in Step S805, the growing direction of L is set for the target cells (Step S808). When it is determined in Step S802 that the left cell and the right cell of the target cell are not defined as reference points, the process proceeds to Step S803. When it is determined in Step S803 that the growing direction of R or L is not set for the left cell of the target cell, the process proceeds to Step S804. When it is determined in Step S804 that the growing direction of R or L is set for the right cell of the target cell, the growing direction of R is set for the target cell (Step S809). When it is determined in Step S804 that the growing direction of R or L is not set for the right cell of the target cell, the process proceeds to Step S806 so as to perform the above-described processes.

Through the above-described processes, a position-controlling matrix as shown in FIG. 7 corresponding to the order of threshold values shown in FIG. 12 and the most suitable for the dither matrix shown in FIGS. 6A and 6B can be generated.

[Automatic Generation of Dither Matrix]

Next, automatic generation of the dither matrix for the multilevel dither processing used for printing on the basis of printing conditions specified by users through the operating unit 104 and the like will be described.

FIG. 13 illustrates an example of a screen displayed on the operating unit 104 or the like during setting of printing conditions.

A user can input an arbitrary value in a text box 1201 for specifying the number of lines of dots per inch on a halftone screen in the multilevel dither processing. Similarly, the user can input an arbitrary value in a text box 1202 for specifying the angle of screen in the multilevel dither processing. The values input in the text boxes 1201 and 1202 are set when the user presses an OK button 1203. The controller 102 then generates a dither matrix on the basis of the input values, and stores the matrix in the RAM 306 or the like. The input values become null when the user presses a CANCEL button 1204.

In the following case, the number of lines of dots per inch is set to 200, and the angle of screen is set to 0 via the setting screen shown in FIG. 13. Under these conditions, the controller 102 generates the dither matrix shown in FIGS. 6A and 6B, stores the matrix in the RAM 306, and uses the matrix in the halftone processing 302 during printing. Herein, the printer 103 according to this exemplary embodiment has a resolution of 600 dpi.

In general, there are limitations on the number of lines or the angle reproduced by the dither matrix according to the resolution of image data or the resolution of printers. Therefore, it is sometimes difficult to generate a dither matrix fulfilling the printing conditions specified by the user. In such a case, a dither matrix meeting printing conditions closer to those specified by the user is generated.

Next, the controller 102 generates a position-controlling matrix corresponding to the generated dither matrix through the above-described processes, and stores the position-controlling matrix in the RAM 306.

In this manner, the position-controlling matrix as shown in FIG. 7 that is the most suitable for the dither matrix for the multilevel dither processing shown in FIGS. 6A and 6B can be automatically generated from the dither matrix, and many hours that would have been spent designing the position-controlling matrix corresponding to the dither matrix for the multilevel dither processing can be greatly saved. As a matter of course, the controller that automatically generates the dither matrix can also automatically generate the position-controlling matrix corresponding to the dither matrix for the multilevel dither processing. That is, the optimum position control can always be performed although the growing directions of the dots cannot be specified in the dither matrix in advance.

In the first and second exemplary embodiments, the growing direction of C is set for the reference points. However, the growing direction of R or L may be set for the reference points.

Moreover, the condition of comparison between dL and dR in Step S807 in FIG. 9 is $dL \leq dR$, but may be $dL < dR$.

Other Exemplary Embodiments

The present invention can be applied to systems including a plurality of devices (for example, host computers, interface devices, readers, printers, and the like), or can be applied to apparatuses including one device (for example, copying machines, facsimile machines, and the like).

Moreover, memory media (recording media) including software that achieves the functions according to the above-described exemplary embodiments can be supplied to systems or apparatuses. The software can be executed using computers (CPUs or micro-processing units (MPUs)) in the systems or the apparatuses. In this case, the software read out of the memory media achieves the functions according to the above-described exemplary embodiments, and therefore, the memory media in which the software is stored is included in the present invention.

Moreover, the above-described functions can be achieved by operating systems (OSs) and the like working on the computers, the OSs executing a part of or all the actual processes in accordance with the software instructions.

Moreover, the above-described functions can be achieved by CPUs and the like of feature-expanded cards or units connected to the computers, the software being written in memories in the cards or the units and the CPUs executing a part of or all the actual processes in accordance with the software instructions.

When the present invention is applied to the memory media, the software corresponding to the above-described flow chart is stored in the memory media.

According to the present invention, setting of the growing directions of the dots in the dither matrix for the multilevel dither processing can be facilitated.

Moreover, the growing directions of the dots can be set according to the automatically generated dither matrix.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Patent Application No. 2005-337495 filed Nov. 22, 2005, which is hereby incorporated by reference herein in its entirety.

What is claimed is:

1. An information processing method for defining growing directions of dots corresponding to cells in a dither matrix used for multilevel dither processing, the information processing method comprising:

defining a target cell in the dither matrix;

determining whether a reference point is located within a range of one cell from the target cell;

setting the target cell as a reference point when it is determined that a reference point is not located within a range of one cell from the target cell; and setting the growing direction of the dot in the target cell based on setting states of the growing directions of the dots in the cells located at the immediate left and the immediate right of the target cell and the reference point when it is determined that a reference point is located within a range of one cell from the target cell.

2. The information processing method according to claim 1, wherein the target cell is sequentially defined in increasing order of growth of the dots in the dither matrix.

3. The information processing method according to claim 1, wherein the target cell is sequentially defined in increasing order of threshold values at a predetermined output value in each cell.

4. The information processing method according to claim 1, wherein the growing direction of the target cell is set to the left when a cell having a growing direction or a reference point is located at the immediate left of the target cell and a cell without a growing direction is located at the immediate right of the target cell;

the growing direction of the target cell is set to the right when a cell having a growing direction or a reference point is located at the immediate right of the target cell and a cell without a growing direction is located at the immediate left of the target cell; and the growing direction of the target cell is determined based on a relationship between a distance from the target cell to the left nearest reference point and a distance from the target cell to the right nearest reference point when cells having growing directions are located at both adjacent sides of the target cell.

5. A recording medium having stored thereon computer-executable instructions for performing the information processing method according to claim 1.

6. An information processing apparatus for controlling growing directions of dots corresponding to cells in a dither matrix used for multilevel dither processing, the information processing apparatus comprising:

a generating unit that generates a position-controlling matrix based on the dither matrix, the position-controlling matrix indicating the growing directions of the dots;

a dither-processing unit that performs the multilevel dither processing on image data using the dither matrix; and an adding unit that adds control data to the image data after the multilevel dither processing using the position-controlling matrix, the control data indicating the growing directions of the dots.

7. The information processing apparatus according to claim 6, further comprising:

an input unit for inputting printing conditions for setting the dither matrix; and a setting unit for setting the dither matrix based on the input printing conditions.

8. The information processing apparatus according to claim 6, further comprising:

an image-forming unit that controls the growing directions of the dots in accordance with the control data and forms images based on the image data after the multilevel dither processing.

9. The information processing apparatus according to claim 6, wherein the generating unit generates the position-controlling matrix by defining a target cell in the dither matrix, determining whether a reference point is located within a range of one cell from the target cell, setting the target cell as a reference point when it is determined that a reference point is not located within a range of one cell from the target cell, and setting the growing direction of the dot in the target cell based on setting states of the growing directions of the dots in the cells located at the immediate left and the immediate right of the target cell and the reference point when it is determined that a reference point is located within a range of one cell from the target cell.

10. An information processing method for defining growing directions of dots corresponding to cells in a dither matrix used for multilevel dither processing, the information processing method comprising:

generating a position-controlling matrix based on the dither matrix, the position-controlling matrix indicating the growing directions of the dots;

performing the multilevel dither processing on image data using the dither matrix; and adding control data to the image data after the multilevel dither processing using the position-controlling matrix, the control data indicating the growing directions of the dots.

11. The information processing method according to claim 10, further comprising:

inputting printing conditions for setting the dither matrix; and setting the dither matrix based on the input printing conditions.

12. The information processing method according to claim 10, further comprising:

controlling the growing directions of the dots in accordance with the control data; and forming images based on the image data after the multilevel dither processing.

13. The information processing method according to claim 10, wherein generating a position-controlling matrix based on the dither matrix comprises defining a target cell in the dither matrix, determining whether a reference point is located within a range of one cell from the target cell, setting the target cell as a reference point when it is determined that a reference point is not located within a range of one cell from the target cell, and setting the growing direction of the dot in the target cell based on setting states of the growing directions of the dots in the cells located at the immediate left and the immediate right of the target cell and the reference point when it is determined that a reference point is located within a range of one cell from the target cell.

* * * * *